United States Patent

[11] 3,628,468

[72] Inventor John A. Angelbeck, Jr.
  Chesterfield, Mo.
[21] Appl. No. 34,947
[22] Filed May 6, 1970
[45] Patented Dec. 21, 1971
[73] Assignee Pack-Rite Packaging & Crating Co., Inc.
  Continuation-in-part of application Ser. No. 819,130, Apr. 25, 1969, now Patent No. 3,563,184. This application May 6, 1970, Ser. No. 34,947

[54] PLASTIC PALLET WITH REINFORCING MEMBERS
  6 Claims, 4 Drawing Figs.
[52] U.S. Cl. ..................................................... 108/53, 108/53
[51] Int. Cl. ............................................................ B65d 19/18
[50] Field of Search ............................................. 108/51–58; 214/621, 625

[56] References Cited
  UNITED STATES PATENTS

| | | | |
|---|---|---|---|
| 3,140,672 | 7/1964 | De Luca | 108/58 X |
| 3,187,691 | 6/1965 | Leitel | 108/58 |
| 3,228,358 | 1/1966 | Sere, et al. | 108/51 |
| 3,393,647 | 7/1968 | Howell | 108/52 |
| 3,424,110 | 1/1961 | Tout | 108/53 |
| 3,467,032 | 9/1969 | Rowlands | 108/51 |
| 3,536,184 | 2/1971 | Angelbeck, Jr. | 108/51 |

*Primary Examiner*—Bobby R. Gay
*Assistant Examiner*—Glenn O. Finch
*Attorney*—Robert J. Schaap

ABSTRACT: A pallet used for the storage and transporting of containers such as beer kegs and the like. The pallet is formed as a unitary plastic member in a rotational molding operation and includes a pair of spaced outer skins which are internally connected by a plurality of properly spaced webs for internal strength. The skins also have a plurality of strategically located apertures which extend through each of the skins and are formed by webs which extend between the skins. A pair of reinforcing members formed of wood, metal or the like extend longitudinally through the pallet and engage the interiorly presented surfaces of a portion of the skins. The pallet has a plurality of downwardly extending shoulders for engagement with containers on its underface and is also provided with supporting areas on its upwardly presented surface for removably supporting a plurality of like containers.

PATENTED DEC21 1971    3,628,468
FIG. 1
FIG. 2
FIG. 3
FIG. 4
INVENTOR
JOHN A. ANGELBECK, JR.
BY *Robert J. Schaap*
ATTORNEY
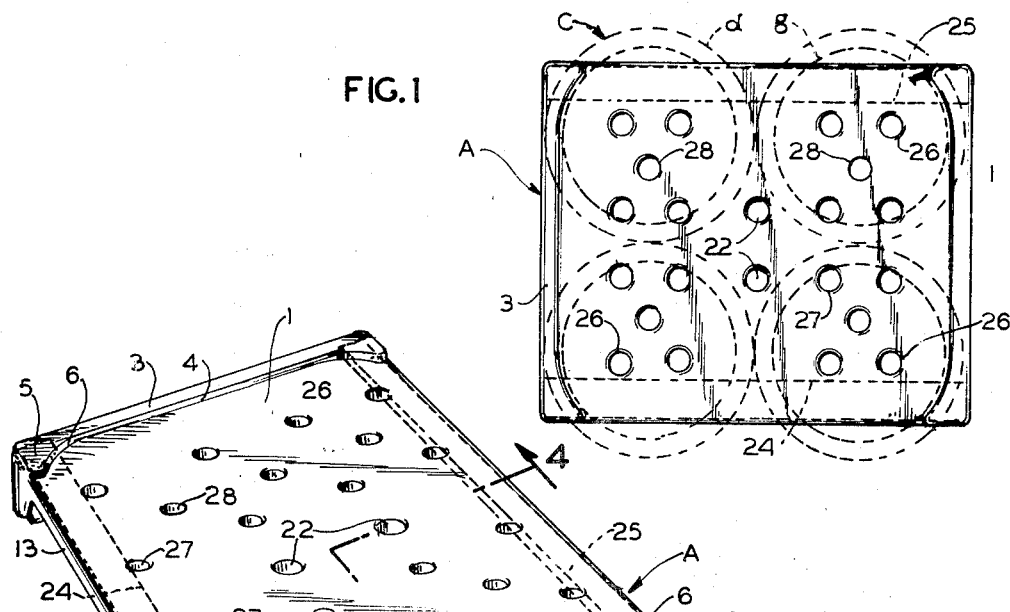
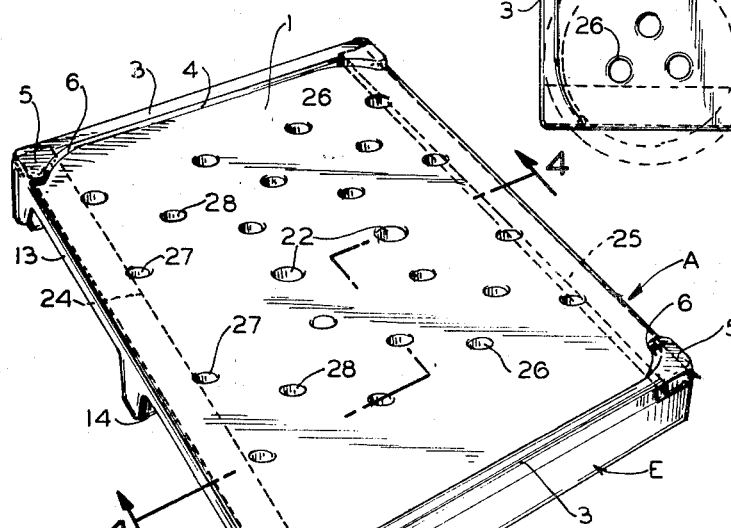
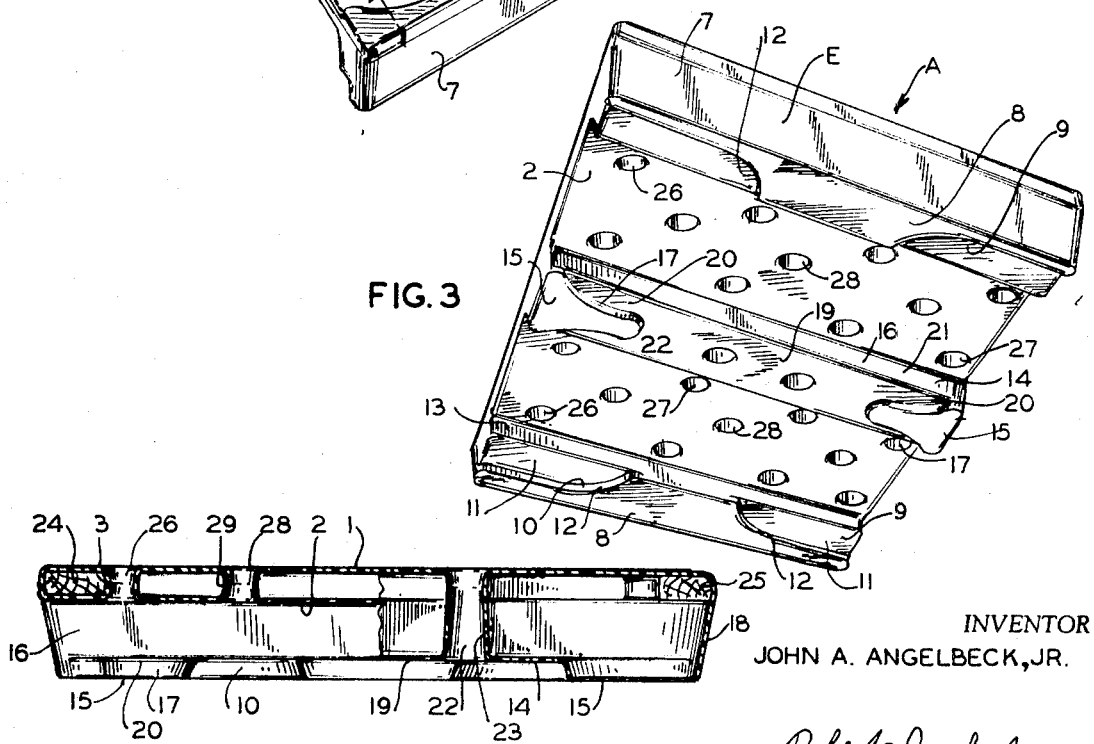

PLASTIC PALLET WITH REINFORCING MEMBERS

This application is a continuation-in-part of my copending application Ser. No. 819,130, filed Apr. 25, 1969, now U.S. Pat. No. 3,563,184

This invention relates in general to certain new and useful improvements in pallets and, more particularly, to pallets which are unitarily formed of a plastic material and include nonplastic reinforcing members for storing and transporting relatively large containers and the like.

For many years it has been a widespread practice to use wooden pallets for the storage and transporting of large containers such as barrels, kegs and the like. The use of pallets formed of wood has been extant to a large degree in such industries as the beer industry where considerably movement of the beer kegs is a resultant facet of manufacturing and delivery.

However, there are a number of drawbacks to the use of wooden pallets, particularly in the realm of economics and practicality. From a practical standpoint, wooden pallets are quite difficult to maintain and after a period of time, are rendered ineffective for use when subject to normal abuse in the trade. Furthermore, where the wooden pallets are used in a normally humid atmosphere or in a location where they are subject to contact with liquid substances, the wood can rapidly deteriorate. From an economic standpoint, the wooden pallets have a shorter life than pallets made from other materials and in addition are more costly in terms of purchase price than pallets formed of nonwooden materials.

Many problems are inherent in the use of wooden pallets in a wide variety of applications. The wooden pallets are constructed by placing the frame members and cover boards in the desired locations and securing the same by means of nails or staples. However, after some use, these metal securement means are ultimately urged out of their point of securement thereby rendering the pallet defective. Vibration, which often results from carrying the pallets on a moving vehicle, causes the nails or other metal fasteners to work out of their fastening positions. Furthermore, the wooden pallets have a substantially greater weight than a plastic pallet constructed of substantially equal size. Consequently, freight costs are higher when wooden pallets are employed over plastic counterpart pallets.

There are other less obvious, but nevertheless, serious disadvantages in the use of wooden pallets. The fibrous nature of wood used in the wooden pallets does not readily lend the pallets to complete sterilization, which may be desirable in many applications. In addition, a plastic pallet can be colored to the customer's specifications by incorporating a dye or other coloring agent into the plastic particles prior to the molding operation. While wooden pallets can be painted, the additional operation raises the total cost of the pallet. Furthermore, after a period of use, the paint will begin to deteriorate or wear off thereby necessitating a repainting of the pallet.

There has been a recent introduction in the marketplace of pallets formed primarily of plastic materials. However, these pallets, like their wooden counterparts also suffer from a number of disadvantages. The plastic pallets thus far available do not have sufficient internal strength inherent in their construction to withstand the abuse normally imposed on these devices. Furthermore, the presently employed processes for producing these pallets resulted in a substantial cost which did not afford any significant economic advantage over wooden pallets.

The presently available pallets formed of plastic materials also suffer from an inherent disadvantage in that they are not designed to retain any particular load-bearing item thereon in such manner that the item will not shift during transporting of the pallet. In the case of transporting beer kegs and the like, the extant pallets do not include any mechanism for holding the barrels or kegs against inadvertent spillage. If the forklift operator, or operator of similar equipment used in the transporting of the pallets with the loads thereon does not exercise due care, one or more of the kegs or barrels may inadvertently fall off of the pallet. This inadvertent spillage not only results in economic loss from damage to the load bearing item but presents a hazard to personnel in the area.

The presently available pallets formed of plastic material also suffer from one other serious structural deficiency. The plastic pallets extant in the industry are constructed so that they are capable of supporting their own weight and the weight of the load-bearing items disposed thereon for which they were designed. Furthermore, some of these plastic pallets are capable of supporting the weight of load-bearing items disposed thereon as well as two or possibly three other pallets in a tier or stack when the second of third pallets have load-bearing items on their supportive surfaces. However, the plastic materials used in the formation of these pallets do not lend themselves to support considerable quantities of weight when a large number, such as 10 or 12 pallets, are stacked with loads thereon in marginal registration.

It is, therefore, the primary object of the present invention to provide a pallet for the storage and transporting of large containers and similar structures, where the pallet is characterized by a unitary plastic construction with nonplastic reinforcing members.

It is another object of the present invention to provide a pallet of the type stated which is selectively provided with a plurality of strategically located internal webs to afford sufficient internal strength.

It is another salient object of the present invention to provide a plastic pallet of the type stated which includes rigid reinforcing members so located to enable the pallet to support load bearing structures equivalent to load bearing structures supported by nonplastic pallets of equivalent construction.

It is a further object of the present invention to provide a pallet of the type stated which is relatively rigid in its construction and which is relatively inexpensive to manufacture.

It is an additional object of the present invention to provide a pallet of the type stated which is capable of effectively competing with conventional wooden pallets.

It is also an object of the present invention to provide a pallet of the type stated which is capable of being used in a wide variety of conditions and which can be used for supporting a wide variety of types and sizes of containers and other structures.

With the above and other objects in view, my invention resides in the novel features of form, construction, arrangement and combination of parts presently described and pointed out in the claims.

In the accompanying drawings (one sheet):

FIG. 1 is a top plan view of a pallet constructed in accordance with and embodying the present invention, with a plurality of container positions being represented by dotted lines therein;

FIG. 2 is a perspective view of the pallet of FIG. 1 showing the upper portion thereof;

FIG. 3 is a perspective view of the pallet of FIG. 1 showing the lower portion thereof; and FIG. 4 is a vertical sectional view taken along line 4—4 of FIG. 2.

GENERAL DESCRIPTION

Generally speaking, the present invention relates to a pallet which is entirely formed of a plastic or synthetic resinous material in a unitary structure. The pallet has spaced top and bottom walls with enlarged transverse end sections. The end sections are provided with legs for supporting the pallet on the floor or similar supporting structure. A central support section is also provided midway between the two end sections, the central section also containing legs for engagement with the floor or similar supporting structure. The top wall of the pallet is integrally formed with a pair of spaced laterally extending upstanding retaining flanges. The flanges are provided with curved terminal sections to engage the lower margins of barrels or kegs which are disposed on the top wall in supportive position.

The end sections and the central section have downwardly presented load-bearing shoulders for receiving the upper margins of containers disposed on a similar pallet therebeneath. The bottom wall is also provided with arcuately shaped retaining walls on both of the end sections and the central support section which aids in rigidly retaining in position barrels which are disposed on a pallet immediately therebeneath. The pallet is provided with strategically located apertures formed by webs which provide internal strength and rigidity. A plurality of structural reinforcing members extend longitudinally through the pallet and engage a portion of the interiorly presented surfaces of each of the top and bottom walls.

DETAILED DESCRIPTION

REferring now in more detail and by reference characters to the drawings, which illustrate a preferred embodiment of the present invention, A designates a pallet which is formed of unitary construction from a suitable plastic or synthetic resin material such as high-density polyethylene. The pallet A is formed as an integral unit with a pair of essentially opposed and spaced sheets or so-called "skins" as illustrated in FIGS. 2, 3 and 4.

It has been found in connection with the present invention that rotational molding is one of the most effective molding techniques used in the formation of the pallets. While high-density polyethylene has been found to be one of the most suitable materials used in the formation of the pallets, the invention is by no means limited to this particular material. Other materials which can be used in the formation of the pallets are polyvinyl chloride, polystyrene, polystyrene-butadiene copolymers, a number of other polyvinyl halide polymers and a number of acrylate and methacrylate copolymers, etc.

The resin chosen for use in the manufacture of the pallet would normally depend upon the particular desired end use of the pallet. Strong consideration is given to the density and melt index of the resin to be selected inasmuch as these parameters will influence properties such as softening temperature, stiffness, environmental stress cracking resistance, and impact strength. A higher softening temperature is desirable in applications which may require sterilization of the pallet or high-temperature use. A high-rigidity factor is desirable where the pallets are constructed with a thin wall for economic reasons or where good dimensional stability is important.

In many cases, it may be desirable to add stabilizers so that the resin used in the formation of the pallet is properly protected from both thermal and ultraviolet light degradation. These additives are conventionally well known and the particular additive and the amount used will depend on the service and color requirements of the pallet. It may also be desirable to add a pigment or other coloring agent to the plastic pallets used in the formation of the pallet, in order to render the desired color to the pallet. Again, the coloring agents which would be employed are well known in the plastics industry. Some of the conventional well-known coloring agents are isoindolinone, dianisidine, anthrapyrimidine phthalocyanine, carbon black, titanium dioxide, etc.

The pallet A generally comprises a relatively flat top wall 1 and spaced downwardly therefrom is an opposed relatively flat bottom wall 2. Integrally formed with the top wall 1 and bottom wall 2 are end sections E which extend along the transverse ends of the top and bottom walls 1,2. The end sections E comprise a pair of transverse upwardly extending rectangular retaining flanges 3 which are integrally formed with the top wall 1 and have inwardly presented vertical abutment surfaces 4.

The flanges 3 are provided with enlarged terminal sections 5 along the forward and rearward margins of the top wall 1. The terminal sections 5 integrally include arcuately shaped inwardly presented walls 6. By reference to FIG. 1, it can be seen that containers C disposed on the top wall 1 have a large central diameter $d$ in the vertical dimension and smaller upper and lower periphery diameters $g$ in the vertical dimension. Furthermore, the walls 6 are formed with a radius which conforms to the radius of the upper and lower margins with diameter $g$ so that the walls 6 snugly engage the lower margins of the containers C disposed on the top wall 1.

Each of the retaining flanges 3 integrally merge into outwardly presented end walls 7 which, in turn, merge into downwardly presented transversely extending base walls 8. The base walls 8 are cut away in the provision of somewhat arcuately shaped barrel-receiving recesses 9. The barrel-receiving recesses 9 are defined by inwardly and upwardly extending inclined walls 10 which are integrally formed with the base walls 8 and which also integrally merge into relatively flat downwardly presented load-bearing shoulders 11. By reference to Figure it can be seen that the inclined walls 10 extend from the forward and rearward margins of the pallet A and terminate somewhat near the longitudinal centerline of the pallet A in arcuately shaped terminal sections 12. The load bearing shoulders 11 and the portion of the bottom walls 8 which are not cut away in the provision of the recesses are integrally connected to the bottom wall 10 by means of inwardly facing flat vertical walls 13.

By reference to FIGS. 2 and 3, it can be seen that the terminal sections 12 forming part of the base walls 8 are provided with a radius which is equivalent to the radius of the upper margin of the container C. Accordingly, when the pallet A is disposed on and supported by a plurality of properly located containers C, the upper margins of the containers C will engage the arcuate terminal sections 12 and will, in essence, positionally locate the pallet A. Furthermore, when a pallet A in a stack of pallets has a load thereon and is supported by a plurality of containers C on a like pallet, each of the stacked pallets will be somewhat locked in marginal registration. The weight of the containers C on the pallet A will provide a downwardly directed force and the containers C disposed beneath the pallet A will engage both the arcuate terminal sections 12 and a portion of the inclined walls 10 and thereby prevent lateral or longitudinal shifting of the pallet A. Thus, it can be seen that the pallet A is essentially locked into position in marginal registration with other pallets A when the pallets are used with load bearing structures in stacked relationship.

It should also be recognized that the end sections E serve as load-bearing elements and are, therefore, formed with substantial thickness. The base walls 8 are designed to support the pallet A when placed directly on a floor or other supporting structure. Furthermore, the load-bearing shoulders 11 are designed to engage the upper margins of the containers C when the pallets are used in stacked relationship in the manner as previously described.

Integrally formed with the bottom wall 2 somewhat centrally thereof, and extending downwardly therefrom is a transversely extending center support 14 which is essentially rectangular in horizontal cross section and which is more fully illustrated in FIGS. 3 and 4. The center support 14 is integrally provided with a pair of downwardly extending transverse floor-engageable support ribs 15 which extend inwardly from the forward and rearward margins of the bottom wall 2. By further reference to FIG. 4, it can be seen that the support ribs 15 each extend inwardly for a distance approximately one-fourth of the overall transverse dimension of the bottom wall 2.

The support ribs 15 each have an overall shape as illustrated in FIG. 5 and have tapered inwardly presented end walls 16 which are inclined at about a 45° angle. The end walls 16 integrally merge into a pair of oppositely spaced arcuately shaped guide walls 17, and which, in turn, merge into outwardly presented end walls 18, in the manner as illustrated in FIGS. 3 and 4. The center support 14 is also provided with a relatively flat downwardly presented surface 19, and the portion of the downwardly presented surface 19 which lies between the arcuately shaped guide walls 17 and the transverse margins of the surface 19 serve as load bearing shoulders 20. Finally, the downwardly presented surface 19 is integrally connected to the bottom wall 2 through outwardly facing vertical walls 21. It should be observed that the vertical walls 21 are slightly inclined at about a 10° angle of taper.

By further reference to FIG. 3, it can be seen that the load-bearing shoulders 20 cooperate with the oppositely disposed load bearing shoulders 11 to receive the upper peripheral margin of a container C. Furthermore, the arcuately shaped guide walls 17 are properly spaced from and are formed with the same radius as the opposed and cooperating arcuately shaped terminal sections 12. Moreover, the overall diameter of a circle formed by these arcuately shaped guide walls 17 and arcuately shaped terminal sections 12 is approximately equal to the overall diameter of the upper peripheral margins of the containers C.

Thus, it can be seen that the upper margin of a container C will be in engagement with the load bearing shoulders 11, 20 and with the terminal sections 12 and guide walls 17. Accordingly, a container C is snugly disposed in the recess formed by the guide wall 17 and terminal section 12 and thereby prevents either lateral or longitudinal shifting movement of a pallet A disposed on the container C.

The pallet A is provided with a pair of transversely aligned large central apertures 22 which extend through the top wall 1 and through the downwardly presented surface 19 of the center support 14. The apertures 22 extend through the center support 14 and are substantially diametrally larger than the apertures (hereinafter described) extending through the top and bottom walls 1, 2. The apertures 22 are also formed by and surrounded by circular webs 23 which extend between and are integrally formed with the top and bottom walls 1,2. The webs 23 located in the center support 14 have downwardly and outwardly inclined walls with an angle of taper of approximately 10°.

A pair of reinforcing bars 24, 25 extend longitudinally through the pallet A in close proximity to the forward and rearward margins thereof. The reinforcing bars 24, 25 should be noncircular in vertical cross section and are preferably rectangular in vertical cross section. Furthermore, the reinforcing bars 24, 25 extend for approximately the entire longitudinal dimension of the top and bottom walls 1, 2 and terminate adjacent to the end walls 7. The reinforcing bars are preferably constructed of a substantially rigid structural material such as wood or a structural metal such as steel. Furthermore, the reinforcing bars 24, 25 have an overall thickness in the vertical dimension which is substantially equivalent to the dimension existing between the interiorly presented faces of the top and bottom walls 1,2.

By reference to FIG. 4, it can be seen that the upper surface of the reinforcing bars 24, 25 engage the greater portion of the interiorly presented surface of the top wall 1 which is disposed immediately above the reinforcing bars 24, 25. In essence, the reinforcing bars 24, 25 engage substantially all of the portion of the interiorly presented face of the top wall which is disposed above the bars 24, 25 with the exception of the end sections E. The lower surface of the reinforcing bars 24, 25 engage substantially all of the portion of the interiorly presented face of the bottom wall which is disposed immediately beneath the bars 24, 25, with the exception of the end sections E and the center support 14.

It is also possible to employ an additional reinforcing bar (not shown) which would be located substantially midway between the two longitudinal margins of the pallet A. This reinforcing bar would be essentially the same as the reinforcing bars 24, 25 and would also snugly engage the interiorly presented surfaces of the top and bottom walls 1, 2 in the same manner as the reinforcing bars 24, 25 engage the interiorly presented surfaces of the top and bottom walls 24, 25. In the event that a center reinforcing bar was employed, the central apertures 22 would be shifted outwardly toward the longitudinal margins of the pallet A in order to provide clearance for the reinforcing bars 24, 25. It should also be recognized that it is possible to employ four or more reinforcing bars, much in the same manner as the previously described reinforcing bars. In the event that four or more of the reinforcing bars are employed, it is important to locate the support bars in positions where they are equally spaced in the transverse dimension. It should be recognized that the support bars could extend laterally as opposed to longitudinally in the pallet structure. Moreover, the apertures 22 and other apertures in the pallet would be located so that they would not interfere with the support bars.

The employment of the reinforcing bars has been found to greatly enhance the overall loading to which the pallets may be subjected. By employment of these bars, it is now possible to stack in tiers a large number of such pallets A, each having load bearing structures thereon. The size of the reinforcing bars and the number of reinforcing bars employed is determined by the weight that the pallet A is required to support.

The reinforcing bars 24, 25 are easily inserted into the pallet A after the latter has been formed by the rotational molding or other molding process. A small portion of one of the end walls 7 is cut away, preferably in the form of a rectangular aperture and the reinforcing bar is thereafter inserted. The reinforcing bar is sized with an overall thickness in the vertical dimension that it will slide between the interiorly presented surfaces of the top and bottom walls 1,2, but nevertheless, snugly engage the interiorly presented surfaces of the top and bottom walls 1,2. After the reinforcing bars 24, 25 have been inserted in the pallet A in the manner as described, the portions of the end wall 7 which were removed are then glued or otherwise adhesively secured to the portions of the end wall 7 from which they were removed. It can be observed that the transverse ends of the reinforcing bars 24, 25 will engage the cutaway portions of the end walls 7 after they have been adhesively secured in place. A conventional epoxy resin has been found to be quite suitable for securing the removed portions of the end wall 7.

The pallet A is also provided with a row of four transversely aligned and spaced apertures 26 in close proximity to each of the relatively flat vertical walls 13. In like manner, the pallet A is also provided with a row of four transversely aligned and spaced apertures 27 in close proximity to each of the relatively flat vertical walls 21. Finally, rows of three transversely aligned and spaced apertures 28 are located midway between each of the rows of apertures 26, 27, in the manner as illustrated in FIG. 1. The apertures in the row of apertures 28 are located so that they are approximately midway between two transversely spaced apertures 26 in the row of apertures proximate the vertical walls 42. Thus, apertures in the row of apertures 26 are transversely aligned, apertures in the row of apertures 27 are transversely aligned and corresponding apertures in the rows 26, 27 are longitudinally aligned.

The apertures in the rows 26, 27, and 28 extend through the top and bottom walls 1, 2. Each of the apertures in the rows 26,27, and 28 is surrounded by and formed by circular webs 29 which extend between the two skins. Thus by reference to FIG. 4, it can be seen that the webs 29 which form the apertures in the rows 26,27, and 28 have slightly inclined walls with a downwardly and inwardly inclined taper extending from the top wall 1 and an upwardly and inwardly inclined taper extending from the bottom wall 2. Thus, it can be seen that the overall diameter of the apertures in the rows 26, 27, and 28 is less at the vertical midpoint of the apertures than at the upper and lower margins of the apertures.

Each of the aforementioned apertures in the pallet A has rounded corners where they are formed in the various components. Furthermore, the various apertures are located in strategic positions so that areas between the end sections E and the center support 14 and which areas support containers C on the pallet A are reinforced by the various webs. In essence, the various webs extending through the two skins forms a type of honeycomb structure providing sufficient internal strength and rigidity. By reference to FIG. 1, it can be seen that the pallets A can be used in a stacked structure arrangement to support a number of levels or tiers of containers C. Four such containers can be placed on the top wall 1 in substantially the location illustrated in FIG. 1. The lower pallet A would be located on the floor or other supporting structure and would rest on the base walls 8 and the support ribs 15.

By further reference to FIG. 4, it can be seen that the reinforcing bars 24, 25 are rigidly held in position against longitudinal shifting inasmuch as the transverse ends of the bars abut against the end walls 7. Furthermore, there is no possibility of vertical shifting movement inasmuch as the upper and lower surfaces of the support bars 24, 25 snugly engage the interiorly presented surface of the top and bottom walls 1,2. Lateral shifting of the support bars 24, 25 is prevented since the support bars 24, 25 engage the longitudinally extending sidewalls of the pallet and since they snugly engage the webs 29 which form the outermost aperture in each of the rows of apertures 26, 27. The outermost apertures located proximate the forward and rearward longitudinal margins of the pallet in these rows of apertures 26, 27 are properly located with respect to the size of the reinforcing bars 24, 25 so as to engage the support bars 24, 25 and thereby hold the same in rigid position in the pallet.

Other pallets A, supporting containers C, can be stacked on similar containers C supported on a like pallet A disposed beneath and in marginal registration with the first-named pallet A. A second pallet A can be disposed above and in supportive engagement with the containers C on the lower pallet A. The upper margins of the containers C would bear against the load-bearing shoulders 11 and 20 of the upper pallet A. Furthermore, it should be observed that the apertures and webs are so located with respect to the reinforcing bars 24, 25 that the portions of the pallet A absorbing the stress imposed have sufficient internal strength and rigidity.

This type of supporting arrangement enables the skids of a forklift truck or similar vehicle (not shown) to be engageable with the underside of the bottom wall 2 of a pallet A without disturbing the containers C on the pallet A therebeneath. It can be observed that there is sufficient clearance between the upper margins of the containers which engage the load-bearing shoulders 11, 20 of a pallet A disposed thereabove and the underside of the bottom wall 2 of this pallet A.

It should also be observed that it is now possible to provide transversely spaced rectangularly shaped apertures in the end walls 7 which are sized to accommodate the skids or forks of a conventional forklift (not shown). Heretofore, the provision of apertures in the sidewalls or end walls of a plastic pallet was not feasible since the materials from which the pallet was formed were not capable of supporting the weight of the pallet with the load-bearing structures thereon without shearing when engaged by skids of a conventional forklift. The provision of the reinforcing bars now enables the use of the apertures in the end walls to receive the skids of such forklifts. In like manner, while the overall shape and structure of the pallet A is the preferred form, it is not absolutely necessary to design the pallet with this structure. The pallet could be constructed in the form of a boxlike structure which is rectangular in both horizontal and vertical cross section, inasmuch as the reinforcing bars provide the required rigidity and absorb much of the load bearing forces.

While the pallet A of the present invention has been illustrated for use with a plurality of barrel-type containers, it should be recognized that the pallet A could be used with containers having different sizes and shapes, as well as with other types of load-bearing structures.

It should be understood that changes and modifications in the form, construction, arrangement and combination of parts presently described and pointed out may be made and substituted for those herein shown without departing from the nature and principle of my invention.

Having thus described my invention, what I desire to claim and secure by Letters Patent is:

1. A load-carrying pallet formed substantially of a plastic material as a substantially integral structure and comprising a first wall adapted to receive load-bearing structures thereon and having an interiorly presented surface, a second wall disposed beneath said first wall and having an interiorly presented surface spaced from the interiorly presented surface of said first wall, peripheral wall-forming means operatively associated with said first and second walls and providing operative connection between said first and second wall, at least one weblike element extending between said first and second walls to integrally join said first and second walls, and at least one rigid nonplastic reinforcing member extending between said first and second walls and snugly engaging the interiorly presented surfaces of said first and second walls.

2. The pallet of claim 1 further characterized in that a plurality of spaced reinforcing members extend between said first and second walls and snugly engage the interiorly presented surfaces of said first and second walls, said reinforcing members being formed of a rigid structural material and being essentially noncircular in cross section.

3. A load-carrying pallet formed substantially of a plastic material as a substantially integral structure and comprising a first wall adapted to receive load-bearing structures thereon and having an interiorly presented surface, a second wall disposed beneath said first wall and having an interiorly presented surface spaced from the interiorly presented surface of said first wall, first and second enlarged sections operatively associated with said first and second walls in proximate relation to a pair of margins of said walls and providing operative attachment between said first and second walls, an intermediate section located between said first and second sections, floor-engageable elements operatively associated with said first and second sections, at least one weblike element extending between said first and second walls to integrally join said first and second walls, and at least one nonplastic reinforcing member extending between said first and second walls and snugly engaging the interiorly presented surfaces of said first and second walls.

4. The pallet of claim 3 further characterized in that load-bearing shoulders are operatively associated with said first and second sections, and cooperating load-bearing shoulders are operatively associated with said intermediate section and cooperating with the load bearing shoulders associated with said first and second sections so that the shoulders of said first and second sections and said intermediate section support the load of said pallet when the pallet is disposed on a load-bearing structure.

5. The pallet of claim 3 further characterized in that a plurality of spaced reinforcing members extend between said first and second walls for a distance approximately equal to the distance between two opposed margins of the first and second walls and snugly engage the interiorly presented surfaces of said first and second walls, said reinforcing members being formed of materials selected from the class consisting of wood and metal, said reinforcing members being rigid and essentially noncircular in cross section.

6. A load-carrying pallet formed substantially of a plastic material as a substantially integral structure and comprising a first wall adapted to receive load-bearing structures thereon and having an interiorly presented surface, a second wall disposed beneath said first wall and having an interiorly presented surface spaced from the interiorly presented surface of said first wall first and second enlarged sections located along two opposed margins of said first and second walls and providing operative attachment between said first and second walls, an intermediate section located approximately midway between said first and second enlarged sections, floor-engageable elements integrally formed with said first and second sections and said intermediate section, load-bearing shoulders operatively associated with said first and second sections, a plurality of load-bearing shoulders operatively associated with said intermediate section and cooperating with the load-bearing shoulders on said first and second sections, at least one aperture extending through said first wall and said intermediate section, a web surrounding said aperture and extending between said first wall and said intermediate section, and a plurality of spaced rigid reinforcing members extending between said first and second walls and snugly engaging a portion of the interiorly presented surfaces of said walls, said members extending for a distance approximately equal to the distance between two opposed margins of the first and second walls, said reinforcing members being formed of a rigid structural material and being essentially noncircular in cross section.

* * * * *

UNITED STATES PATENT OFFICE
CERTIFICATE OF CORRECTION

Patent No. 3,628,468      Dated December 21, 1971

Inventor(s) John A. Angelbeck, Jr.

It is certified that error appears in the above-identified patent and that said Letters Patent are hereby corrected as shown below:

Column 1, line 15, delete "considerably" and insert therefor
---considerable---;

Column 3, line 6, after "position" and before "barrels" insert a comma ---,---;

Column 3, line 16, delete "REferring" and insert therefor
---Referring---;

Column 3, line 17, after "drawings" delete the comma ",";

Column 3, line 54, delete "pallets" and insert therefor
---pellets---;

Column 3, line 58, after "anthrapyrimidine" insert a comma
---,---;

Column 3, line 59, after "black" delete the period "." and insert therefor a comma ---,---;

Column 4, line 14, after "Figure" insert ---3---;

Column 4, line 64, delete "Fig 5" and insert therefor
---Fig 3---;

Column 7, line 9, delete "surface" and insert therefor
---surfaces---;

Claim 6, Column 8, line 60, after "wall" insert a comma ---,---.

Signed and sealed this 30th day of May 1972.

(SEAL)
Attest:

EDWARD M. FLETCHER, JR.
Attesting Officer

ROBERT GOTTSCHALK
Commissioner of Patents